United States Patent
Zhang et al.

(10) Patent No.: US 12,135,893 B2
(45) Date of Patent: Nov. 5, 2024

(54) DYNAMIC NODE CLUSTER WITH STORAGE ARRAY

(71) Applicant: Dell Products L.P., Round Rock, TX (US)

(72) Inventors: Tianming Zhang, Brighton, MA (US); Jason Ye, Suzhou (CN); Shangyu Li, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/162,069

(22) Filed: Jan. 31, 2023

(65) Prior Publication Data

US 2024/0256169 A1    Aug. 1, 2024

(51) Int. Cl.
G06F 3/06    (2006.01)
(52) U.S. Cl.
CPC .......... *G06F 3/0647* (2013.01); *G06F 3/0622* (2013.01); *G06F 3/067* (2013.01)
(58) Field of Classification Search
CPC ....... G06F 3/0622; G06F 3/0647; G06F 3/067
See application file for complete search history.

(56) References Cited

U.S. PATENT DOCUMENTS

| | | | |
|---|---|---|---|
| 11,016,923 B1* | 5/2021 | Bolen | G06F 3/061 |
| 2006/0129769 A1* | 6/2006 | Chen | G06F 3/0607 |
| | | | 711/162 |
| 2011/0173326 A1* | 7/2011 | Lambert | G06F 9/5061 |
| | | | 709/226 |
| 2017/0199694 A1* | 7/2017 | Khemani | G06F 3/0607 |
| 2022/0179576 A1* | 6/2022 | Saad | G06F 3/0659 |

* cited by examiner

*Primary Examiner* — Aracelis Ruiz
(74) *Attorney, Agent, or Firm* — Jackson Walker L.L.P.

(57) ABSTRACT

An information handling system may include at least one processor; and a storage resource having an element manager stored thereon. The information handling system may be configured to: establish, via the element manager, an information handling system cluster, wherein the information handling system cluster includes the information handling system as a first node and at least one other information handling system as a second node; configure the first node and the second node to communicatively couple to a storage array via a network and use the storage array as a primary storage volume for the information handling system cluster; and migrate the element manager to execute from the storage array.

18 Claims, 2 Drawing Sheets

DYNAMIC NODE CLUSTER WITH STORAGE ARRAY

TECHNICAL FIELD

The present disclosure relates in general to information handling systems, and more particularly to techniques for management of compute clusters with external storage.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware© vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In a cluster of information handling systems, some nodes may be designated as dynamic nodes (also referred to as compute nodes). Compute nodes are typically used in a two-tier system in which the storage is provided by one or more external storage arrays. In some embodiments, storage arrays may use Non-Volatile Memory Express over Transmission Control Protocol (NVMe/TCP). Other embodiments may use SCSI or iSCSI connectivity. Compute cluster with multiple nodes hosting workloads may offer high availability via redundancy to tolerate node or other component failures.

Cluster creation may be automated via an element manager (e.g., VxRail Manager in the case of a VxRail cluster), which may run locally on shared storage of the cluster. However, compute servers are often factory-built with no locally attached storage drives, booting instead from a minimal boot volume such as a flash storage chip, which may be integrated onto a motherboard or expansion card of the server. Setting up NVMe/TCP connectivity from a node to a remote array can be difficult or impossible prior to the creation of the cluster, during which the management networks for each compute node are configured and the nodes are added to a centralized management system (e.g., vCenter from VMware®).

Accordingly, it is difficult to bootstrap a self-contained element manager on an un-configured compute node without having access to any external or local attached storage. It would be advantageous to allow the same cluster creation user experience, regardless of whether the cluster is a dynamic node cluster with a storage array connected via NVMe/TCP or a standard HCI cluster. In both cases, it would be advantageous for a user to be able to leverage the same user interface (UI) and/or application programming interface (API) from the element manager to automate cluster deployment.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of storage arrays in information handling systems may be reduced or eliminated.

In accordance with embodiments of the present disclosure, an information handling system may include at least one processor; and a storage resource having an element manager stored thereon. The information handling system may be configured to: establish, via the element manager, an information handling system cluster, wherein the information handling system cluster includes the information handling system as a first node and at least one other information handling system as a second node; configure the first node and the second node to communicatively couple to a storage array via a network and use the storage array as a primary storage volume for the information handling system cluster; and migrate the element manager to execute from the storage array.

In accordance with these and other embodiments of the present disclosure, a method may include, at an information handling system including a storage resource having an element manager stored thereon, establishing, via the element manager, an information handling system cluster, wherein the information handling system cluster includes the information handling system as a first node and at least one other information handling system as a second node; configuring the first node and the second node to communicatively couple to a storage array via a network and use the storage array as a primary storage volume for the information handling system cluster; and migrating the element manager to execute from the storage array.

In accordance with these and other embodiments of the present disclosure, an article of manufacture may include a non-transitory, computer-readable medium having computer-executable instructions thereon that are executable by a processor of an information handling system, wherein the information handling system includes a storage resource having an element manager stored thereon, the instructions executable for: establishing, via the element manager, an information handling system cluster, wherein the information handling system cluster includes the information handling system as a first node and at least one other information handling system as a second node; configuring the first node and the second node to communicatively couple to a storage array via a network and use the storage array as a primary storage volume for the information handling system cluster; and migrating the element manager to execute from the storage array.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
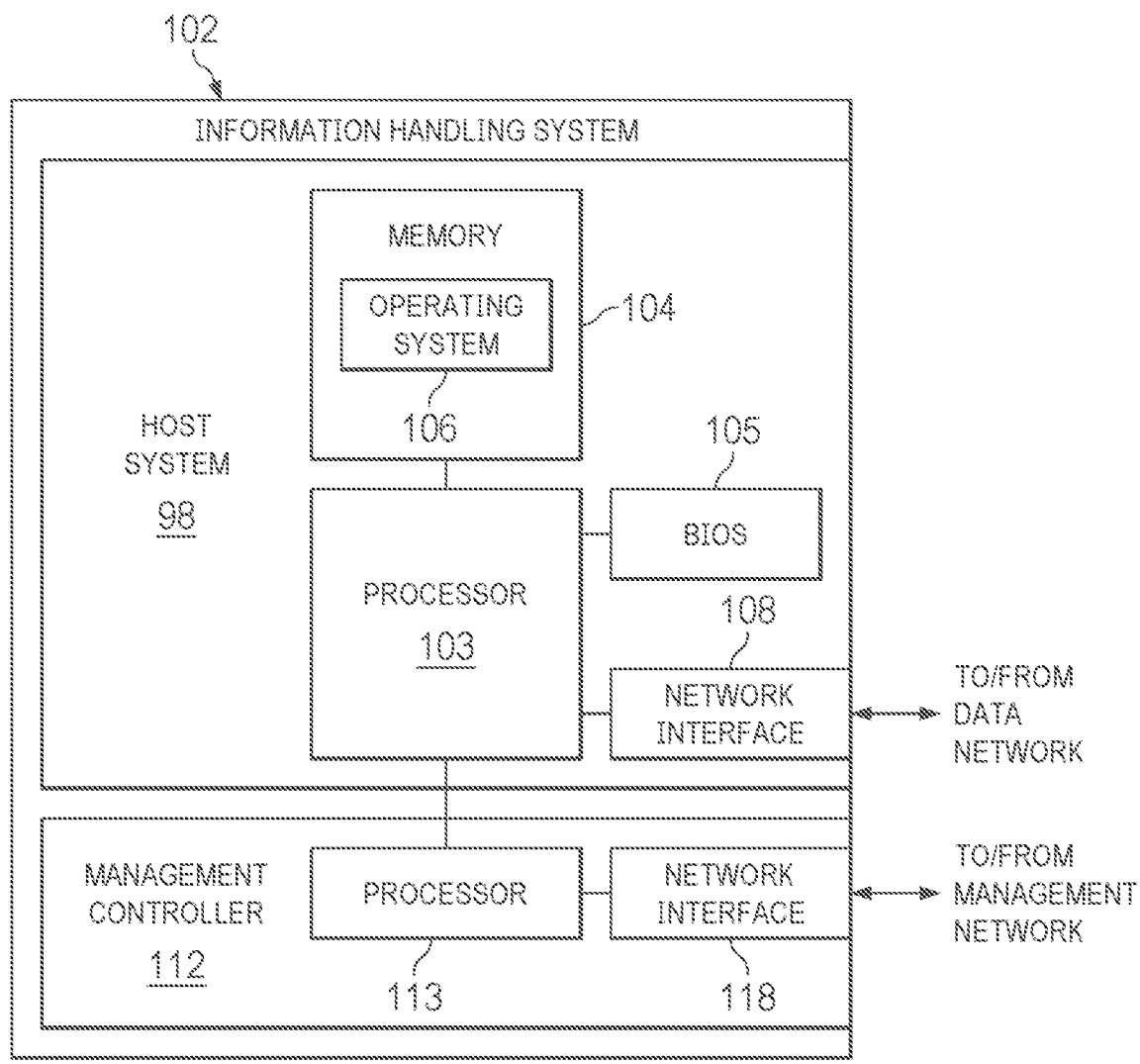
FIG. 1 illustrates a block diagram of an example information handling system, in accordance with embodiments of the present disclosure.
Figure 2:
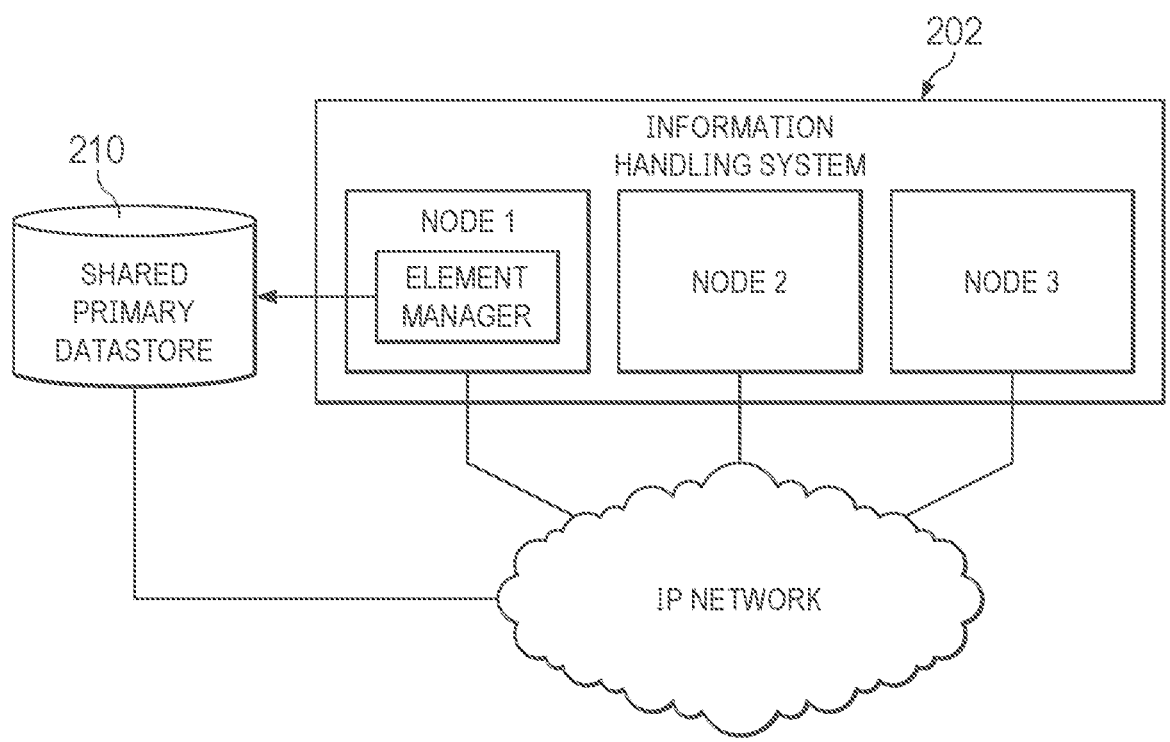
FIG. 2 illustrates a block diagram of a dynamic node cluster, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, information handling system 102 may be a node of a cluster. In the case of an HCI cluster, the element manager for the cluster typically runs from a vSAN data store that is pre-configured for information handling system 102 at the factory. Thus in this instance, the element manager is available during cluster creation and deployment.

However, in embodiments in which information handling system 102 is a dynamic node (also referred to as a compute node) of a compute cluster, it may be factory-configured with no hard disk and no primary data store available. Information handling system 102 may include a small flash element as a boot drive, from which operating system 106 may be booted. Once the compute cluster is operational, information handling system 102 may rely on a shared primary storage volume coupled via network interface 108, but that storage volume may be unavailable during cluster creation.

As discussed above, embodiments of this disclosure thus provide improvements in the deployment of such dynamic node clusters. In one embodiment, the element manager for the cluster may be provisioned to the boot drive of information handling system 102, and it may run from that location during cluster creation in order to facilitate cluster creation. Cluster creation may involve having the element manager add additional information handling systems 102 as nodes of the cluster, and setting up the shared primary storage volume to be usable by the nodes.

Once a shared primary storage volume (e.g., an NVMe/TCP storage array) is configured for the cluster, the element manager may be migrated (e.g., automatically) to be stored on and run from the primary storage volume. In one embodiment, an API may be provided for users to pass in the primary storage volume's information (e.g., its IP address and/or NQN (NVMe Qualified Name)), and the API may automate the migration of the element manager from the boot drive to the primary storage volume. In other embodiments, the migration step may be automated as part of an integrated user experience (e.g., via a UI or an API) after the step of setting up the shared primary storage volume mentioned above. In yet other embodiments, the migration step may be implemented as a manual step.

For the sake of concreteness and explanation, this disclosure describes in detail the example of an NVMe/TCP primary storage volume. However, one of ordinary skill in the art with the benefit of this disclosure will appreciate its applicability to other types of storage volume (e.g., iSCSI, NFS, HCI mesh, etc.).

In some embodiments, the present disclosure enables running an element manager on a diskless compute node to facilitate cluster creation, providing the same simple cluster creation user experience via the local element manager for either HCI cluster creation or diskless compute cluster creation. Embodiments further enable automatic migration of the element manager to a remote primary storage volume such as an NVMe/TCP array for high availability (HA).

According to one embodiment, cluster creation may involve automatic node discovery and election services to discover the available nodes and designate one of them as the primary node. An element manager may then be configured to start running on the primary node immediately once all the nodes are powered on. For dynamic node cluster creation, the element manager runs on the boot drive of the primary node. The user may then leverage the standard element manager UI and/or RESTful API to finish the cluster creation. After this is complete, the cluster may be managed by a vCenter, and the element manager may be available in the vCenter as a plugin.

Turning now to FIG. 2, an example dynamic node cluster is shown, according to some embodiments. Information handling system 202 is a cluster including 3 nodes. When the cluster is first brought online, node 1 is elected as the primary node, and the element manager executes from the boot drive installed in node 1 to enable certain cluster deployment tasks.

In some embodiments, while the element manager executes on the boot drive of the primary node, certain sensitive operations (e.g., lifecycle management, node expansion, and node removal) may be disabled. This restriction may be used to avoid the possibility of a single point of failure causing cluster deployment to fail.

Once the element manager has configured shared primary datastore 210 on all the nodes, the element manager may be migrated to run on this shared cluster-wide storage volume, which provides high availability. An element manager API (an example of which is shown below at listing 1) may be invoked to automate the migration process and enable the sensitive operations that were not allowed while the element manager ran from the boot drive of node 1.

```
curl -request POST 'https://<vxm-ip>/rest/vxm/v1/system/
primary-storage' --data-raw '{
"primary_storage_protocol" : "NVME-TCP",
// external array via NVMe/TCP
"primary_storage_name" : "shared_volume_1",
// shared primary volume name
"storage_policy_profile_name": "HA_policy_1"
// optional policy name}'
Listing 1.
```

After the API is executed successfully, the element manager may continue to execute from shared primary datastore 210, and the user may proceed to manage the cluster via the migrated element manager.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a storage resource having an element manager stored thereon;
   wherein the information handling system is configured to:
   establish, via the element manager, an information handling system cluster, wherein the information handling system cluster includes the information handling system as a first node and at least one other information handling system as a second node;
   configure the first node and the second node to communicatively couple to a storage array via a network and use the storage array as a primary storage volume for the information handling system cluster; and
   migrate the element manager to execute from the storage array.

2. The information handling system of claim 1, wherein the information handling system cluster is a compute cluster.

3. The information handling system of claim 1, wherein the storage resource is a boot drive.

4. The information handling system of claim 1, wherein the storage array is an NVMe/TCP storage array.

5. The information handling system of claim 1, wherein the element manager is configured to restrict access to at least one sensitive operation prior to the migration.

6. The information handling system of claim 5, wherein the element manager is configured to allow access to the at least one sensitive operation subsequent to the migration.

7. A method comprising:
   at an information handling system including a storage resource having an element manager stored thereon, establishing, via the element manager, an information handling system cluster, wherein the information handling system cluster includes the information handling system as a first node and at least one other information handling system as a second node;
   configuring the first node and the second node to communicatively couple to a storage array via a network and use the storage array as a primary storage volume for the information handling system cluster; and
   migrating the element manager to execute from the storage array.

8. The method of claim 7, wherein the information handling system cluster is a compute cluster.

9. The method of claim 7, wherein the storage resource is a boot drive.

10. The method of claim 7, wherein the storage array is an NVMe/TCP storage array.

11. The method of claim 7, wherein the element manager is configured to restrict access to at least one sensitive operation prior to the migration.

12. The method of claim 11, wherein the element manager is configured to allow access to the at least one sensitive operation subsequent to the migration.

13. An article of manufacture comprising a non-transitory, computer-readable medium having computer-executable instructions thereon that are executable by a processor of an information handling system, wherein the information handling system includes a storage resource having an element manager stored thereon, the instructions executable for:
    establishing, via the element manager, an information handling system cluster, wherein the information handling system cluster includes the information handling system as a first node and at least one other information handling system as a second node;
    configuring the first node and the second node to communicatively couple to a storage array via a network and use the storage array as a primary storage volume for the information handling system cluster; and
    migrating the element manager to execute from the storage array.

14. The article of claim 13, wherein the information handling system cluster is a compute cluster.

15. The article of claim 13, wherein the storage resource is a boot drive.

16. The article of claim 13, wherein the storage array is an NVMe/TCP storage array.

17. The article of claim 13, wherein the element manager is configured to restrict access to at least one sensitive operation prior to the migration.

18. The article of claim 17, wherein the element manager is configured to allow access to the at least one sensitive operation subsequent to the migration.

\* \* \* \* \*